(12) United States Patent
Miller

(10) Patent No.: US 7,434,106 B2
(45) Date of Patent: Oct. 7, 2008

(54) REFERENCE CLOCK FAILURE DETECTION ON SERIAL INTERFACES

(75) Inventor: Michael H. Miller, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 585 days.

(21) Appl. No.: 10/447,540

(22) Filed: May 29, 2003

(65) Prior Publication Data

US 2004/0025090 A1 Feb. 5, 2004

Related U.S. Application Data

(60) Provisional application No. 60/400,523, filed on Jul. 31, 2002.

(51) Int. Cl.
*G06F 11/00* (2006.01)

(52) U.S. Cl. .......................... 714/43; 370/222; 370/235

(58) Field of Classification Search .................. 714/43, 714/814, 815; 375/363, 224–226; 370/222, 370/235; 398/1–3, 154, 155; 710/51, 52, 710/58, 60
See application file for complete search history.

(56) References Cited

U.S. PATENT DOCUMENTS

| | | | | |
|---|---|---|---|---|
| 4,127,742 A | | 11/1978 | Couturier | |
| 4,225,917 A | * | 9/1980 | Hepworth et al. | 714/48 |
| 4,270,203 A | * | 5/1981 | Collins et al. | 370/360 |
| 4,542,500 A | | 9/1985 | Jean-Claude | |
| 4,955,020 A | | 9/1990 | Stone | |
| 5,146,477 A | * | 9/1992 | Cantoni et al. | 375/363 |
| 5,233,608 A | | 8/1993 | Savolainen | |
| 5,828,243 A | | 10/1998 | Bagley | |
| 5,930,275 A | * | 7/1999 | Horst | 714/815 |
| 5,946,362 A | * | 8/1999 | Ha | 375/357 |
| 6,008,671 A | | 12/1999 | Kang | |
| 6,122,756 A | | 9/2000 | Baxter | |
| 6,400,683 B1 | * | 6/2002 | Jay et al. | 370/229 |
| 6,442,674 B1 | * | 8/2002 | Lee et al. | 712/205 |
| 6,658,495 B1 | * | 12/2003 | Yoshitake | 710/5 |
| 6,977,897 B1 | * | 12/2005 | Nelson et al. | 370/235 |
| 7,176,928 B1 | * | 2/2007 | Sendrovitz | 345/534 |

* cited by examiner

*Primary Examiner*—Bryce P. Bonzo
*Assistant Examiner*—Philip Guyton
(74) *Attorney, Agent, or Firm*—David K. Lucente

(57) ABSTRACT

The present invention is a system and method for determining clock rate failure in a serial communication interface. A complete clock rate failure can be detected. Alternatively, or in addition, the interface includes a rate matching buffer in which fill characters are added or deleted to accommodate minor clock variations. The number of fill characters added or deleted is monitored to determine whether clock variation is outside of a desired threshold.

18 Claims, 6 Drawing Sheets

REFERENCE CLOCK FAILURE DETECTION ON SERIAL INTERFACES

CROSS-REFERENCE TO RELATED APPLICATION

This application claims priority from U.S. Provisional Application 60/400,523 filed on Jul. 31, 2002 for inventor Michael H. Miller and entitled REFERENCE CLOCK FAILURE DETECTION ON SERIAL INTERFACES.

FIELD OF THE INVENTION

The present invention relates generally to data channel such as those found in data storage systems, and more particularly but not by limitation to serial interfaces networking data channels.

BACKGROUND OF THE INVENTION

Disc drives are common data storage devices. The data storage intensive operations of today often require multiple disc drives to be networked to other resources, including one or more host computers. Network architectures are available in a variety to suit the requirements of the intended use and the communication protocol to be followed. Several common communication protocols are compatible with a serial communication interface.

Serial communication interfaces typically use a reference clock to develop the clock source used to transmit serial data as well as recover serial received data. The transmitter frequency (transmitter reference clock frequency) and the receiver clock frequency (receiver reference clock frequency) are carefully controlled to specific tolerances to ensure the serial data stream can be properly recovered. Serial data transmission protocols are designed to allow minor variations between the data transmitter frequency and the data receiver clock frequency by allowing the insertion and deletion of fill characters within specified limits.

Embodiments of the present invention address these and other problems, and offer other advantages over the prior art.

SUMMARY OF THE INVENTION

In designing serial data transmission systems it can be desirable to include circuitry to detect the total failure of reference clock circuits. One advantage to detecting this type of failure is that the system may be able to take remedial action, such as bypassing the defective unit to maintain an intact loop network architecture. While this, in and of itself, is helpful, further detection may be desirable as well. For instance, this method does not detect types of reference clock failures where the reference clock simply deviates from the specified frequency rather than totally fails. Deviation from the specified frequency may have numerous causes. One example is a reference clock locking to the wrong harmonic of its base crystal frequency. A frequency deviation reference clock failure can prevent the proper transmission or recovery of a serial data stream.

The present invention is a system and method for determining clock rate failure (either total failure or frequency deviation or both) in a serial communication interface. In one embodiment, an interface circuit monitors one clock versus another and looks for the absence of either. In another embodiment, the interface includes a rate matching buffer in which fill characters are added or deleted to accommodate minor clock variations. The number of fill characters added or deleted are monitored to determine whether clock variation is outside of a desired threshold.

Other features and benefits that characterize embodiments of the present invention will be apparent upon reading the following detailed description and review of the associated drawings.

DETAILED DESCRIPTION OF ILLUSTRATIVE EMBODIMENTS

The present invention can be used in a wide variety of systems that use serial data channels such as data storage systems, telecommunication systems, single serial streams or systems with multiple serial streams in parallel. Disc drive data storage systems are but one example and are described herein for exemplary purposes only.

Figure 1:
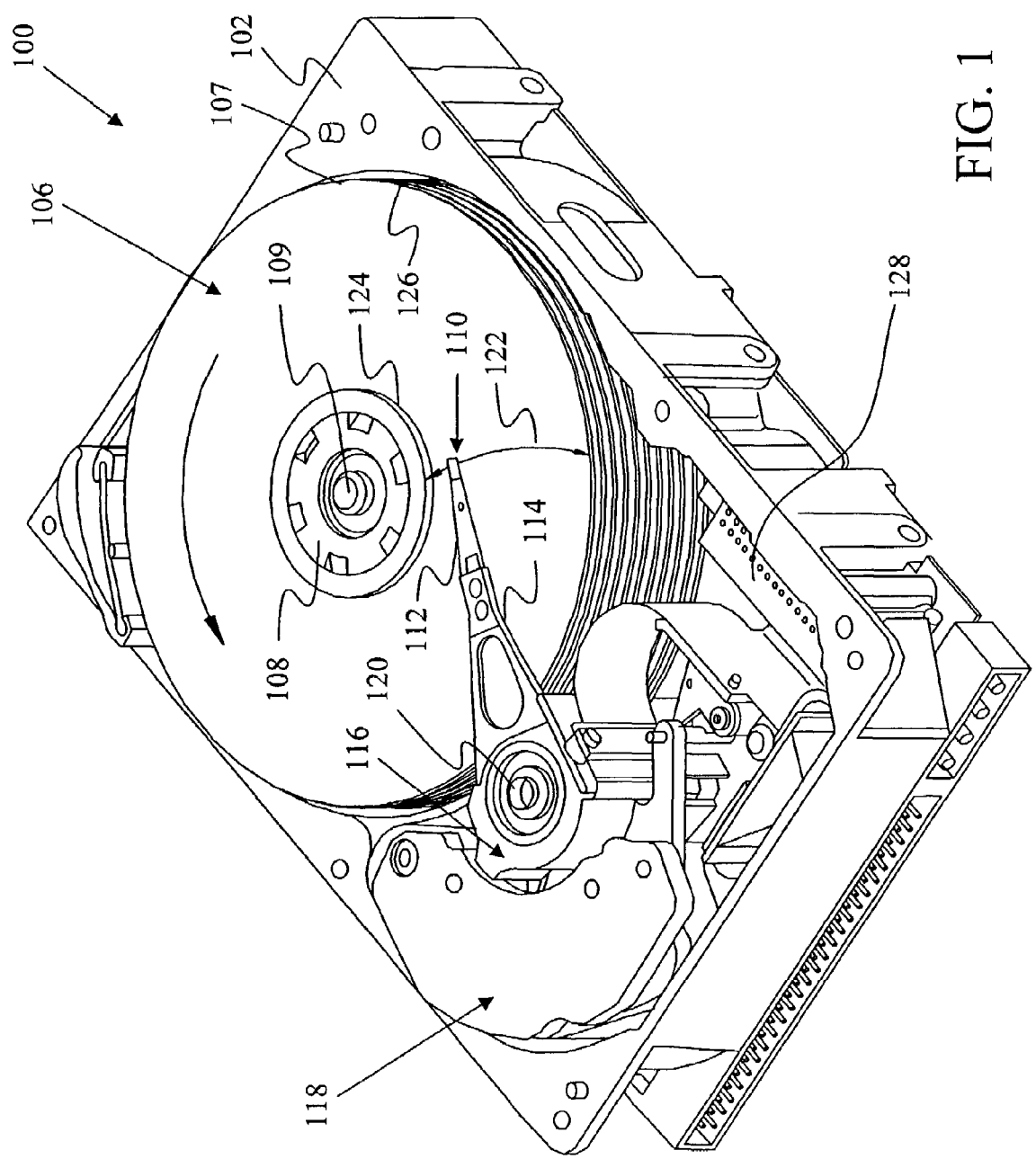
FIG. 1 is an isometric view of a disc drive.

FIG. 1 is an isometric view of a disc drive 100 that can be used to implement embodiments of the present invention. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates a pivot housing on actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics, also known as controller, 128 based on signals generated by heads 110 and a host computer 202 (shown in FIG. 2).

Figure 2A:
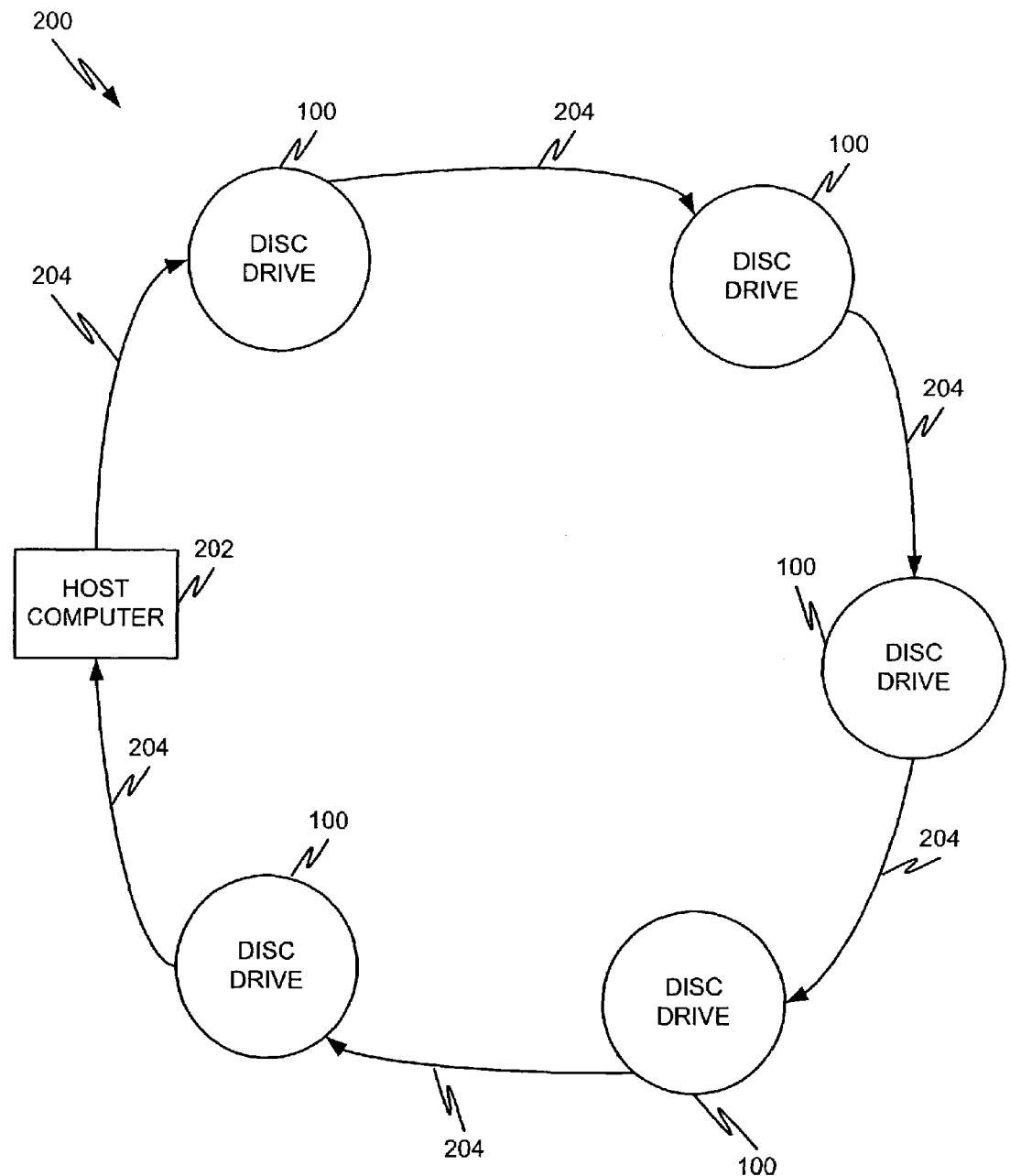
FIG. 2A is a schematic view of an illustrative embodiment of a loop network configuration.

FIG. 2A is a schematic view of an illustrative embodiment of a loop network configuration. Loop network 200 is typical of the architecture of a serial communication network as practiced under the ANSI Fibre Channel serial communication protocol. In this illustrative embodiment, loop network 200 consists of one host computer 202 and five disc drives 100. The serial communication output 204 is received by the first disc drive 100. Each successive disc drive 100 relays serial communication output 204 around the loop until serial communication output 204 is received by host computer 202.

Loop network 200 has a weakness; the failure of any one unit on loop network 200, whether host computer 202 or disc drive 100, shuts down communications around the entire loop network. One common cause of loop network failure is the loss of the reference clock. Consequently, in one embodiment of the invention, a reference clock failure monitor is installed in each of the units on a loop network. Upon the detection of a reference clock failure, the unit is switched to bypass around it, leaving the rest of the loop network working and intact.

Figure 2B:
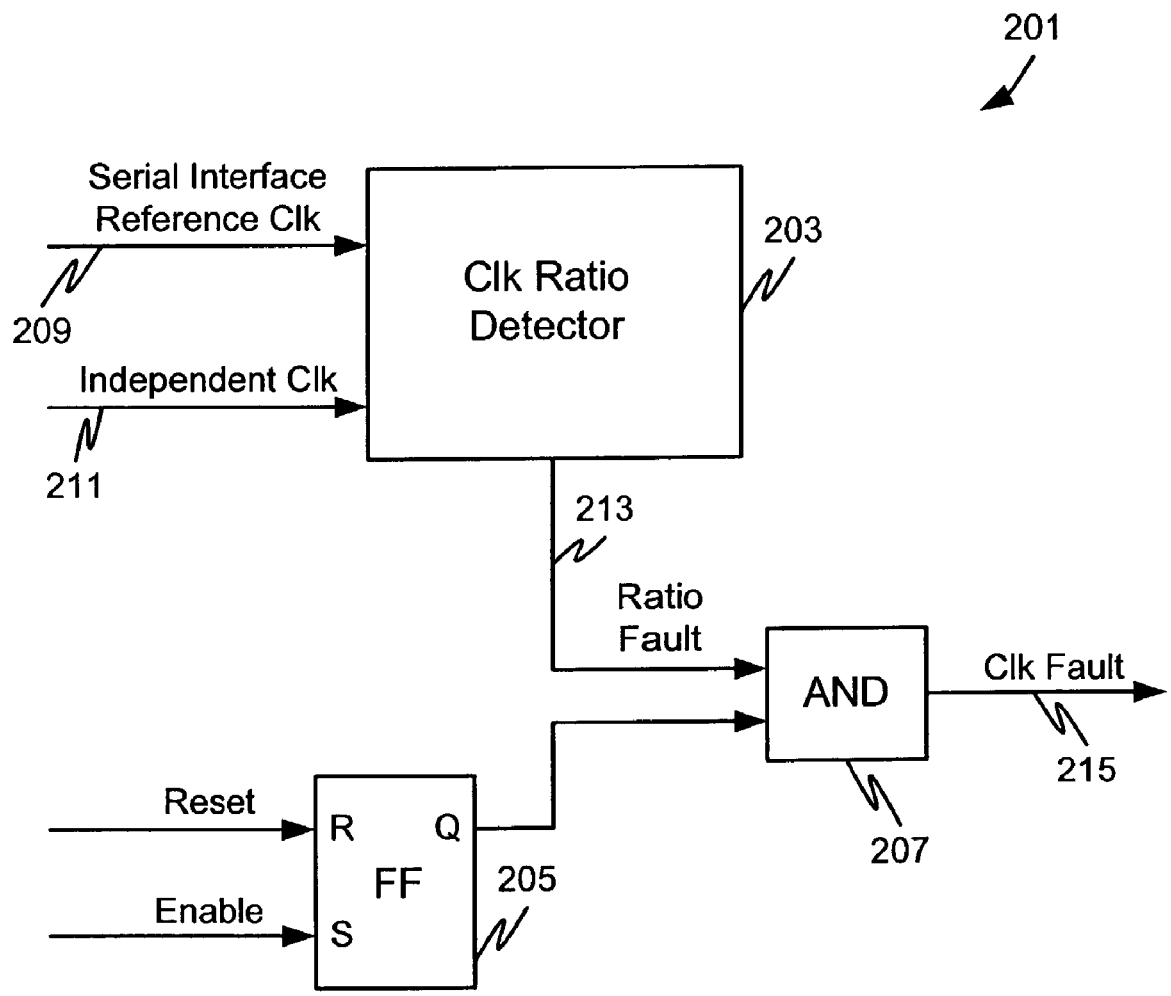
FIG. 2B is a block diagram of a clock failure detection circuit in accordance with one embodiment of the present invention.

FIG. 2B illustrates one embodiment of a clock failure detection circuit 201 which includes clock ratio detector 203, enable circuit 205 and AND gate 207. Detector 203 receives, as inputs, two monitored clock signals 209 and 211 (illustrated as a serial interface reference clock and an independent clock). Detector 203 monitors a ratio of the signals 209 and 211. If the ratio is outside of a given threshold, detector 203 outputs ratio fault signal 213. Fault signal 213 is enabled through gate 207 by setting circuit 205 and is disabled by resetting circuit 205. The output 215 at gate 207 is indicative of whether an enabled clock fault has occurred.

Detector 203 can detect when a reference clock fails by stopping completely. However, it may be desirable to further guard against a clock failing the requirements of the serial communication protocols by being either too slow or too fast. This serial communication protocol permits clock inaccuracies no greater than on the order of 100 parts per million. Any reference clock failure monitor that depends on the cross comparison between two or more reference clocks may be hindered by the need for sufficiently accurate clocks to detect this minor level of error. Maintaining that level of clock accuracy is thus neither easy nor cheap. The following embodiments of the present application are relatively simple and inexpensive.

Figure 3:
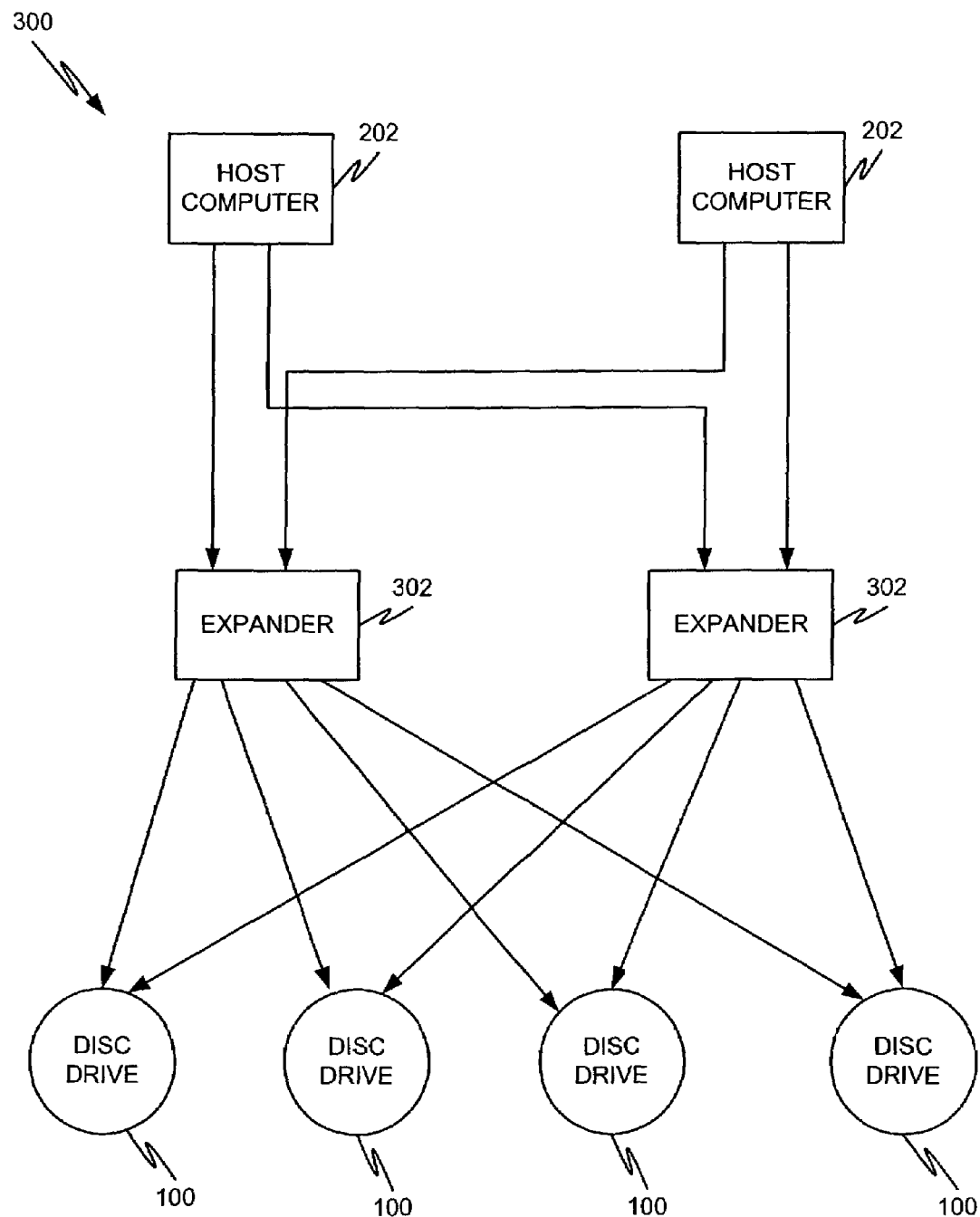
FIG. 3 is a schematic view of another illustrative embodiment of a dual tree network configuration.

FIG. 3 is a schematic view of an illustrative embodiment of a dual tree network configuration. Tree network 300 is typical of the architecture of a serial communication network as practiced under the Serial Attached SCSI serial communication protocol. In this illustrative embodiment, tree network 300 includes two host computers 202, two expanders 302, and five disc drives 100. Each expander 302 connects to all five disc drives 100. Both host computers 202 connect to both expanders 302.

An advantage of this architecture is that each host computer 202 has two separate communication paths to all five disc drives 100. The redundant paths permit host computer 202 to stay connected to a working serial communication path if the other path fails. This advantageous redundancy becomes a disadvantage if a reference clock failure goes undetected, because a single reference clock failure can feed corrupted data into both host computers. Both of the configurations shown in FIGS. 2A and 3 illustratively include interface assemblies of the present invention, as set out in more detail with respect to FIGS. 4 and 5.

Figure 4:
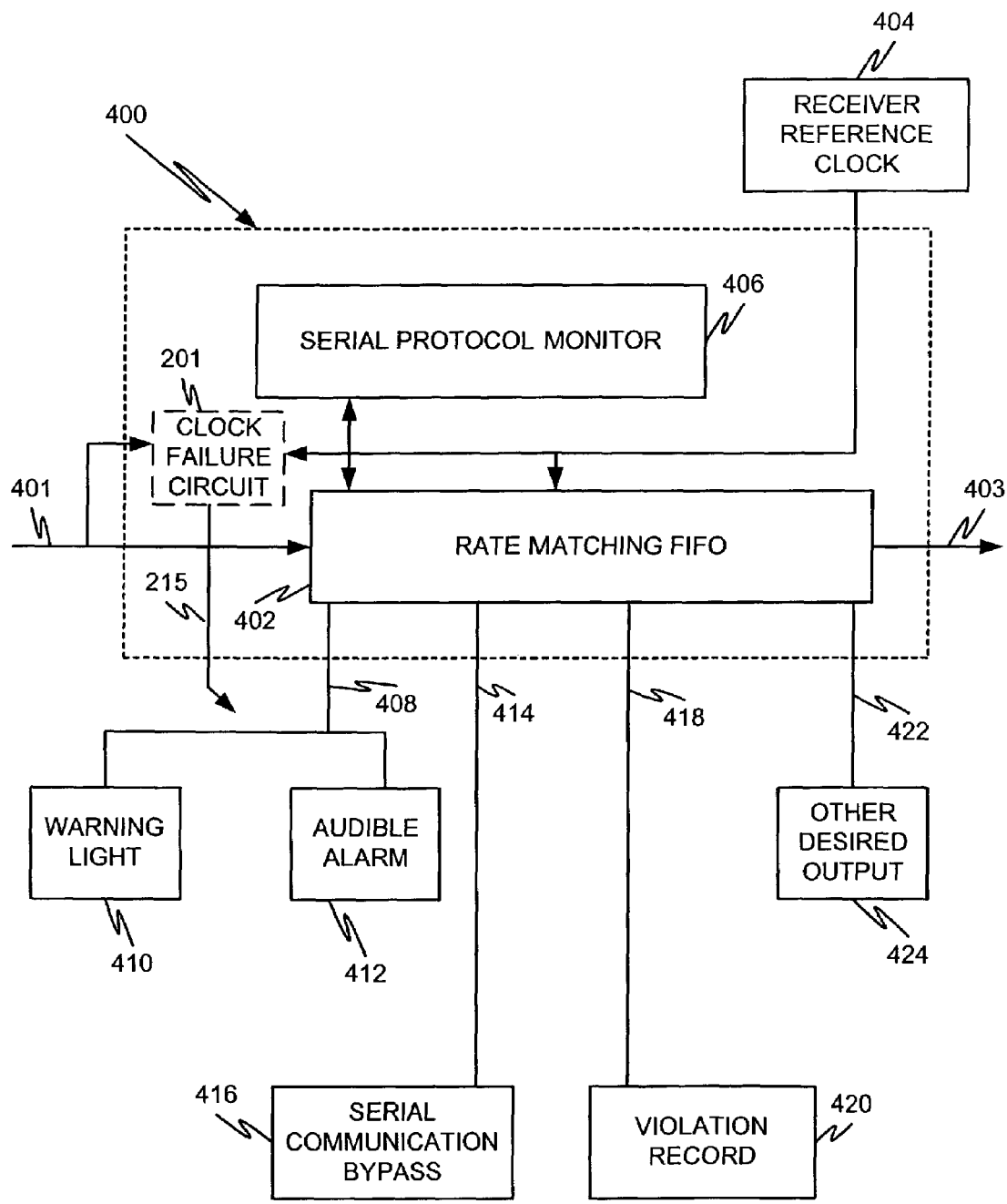
FIG. 4 is a schematic view of another embodiment of a serial interface communication assembly illustrating features of the present invention.

FIG. 4 is a schematic view of an embodiment of a serial communication interface assembly illustrating features of the present invention. Serial communication interface assembly 400 interfaces with a serial communication bus and a transmitter reference clock, both of which are located externally to serial communication assembly 400. Serial communication assembly 400 is comprised of a rate matching data store (such as a First In, First Out-FIFO-register) 402. In one embodiment, assembly 400 can include clock failure detection circuit 201, described with respect to FIG. 2B. In another embodiment, assembly 400 includes a serial protocol monitor 406. Of course, assembly 400 can include both circuit 201 and monitor 406 as well. Serial communication assembly 400 interfaces with a receiver reference clock 404, which may be a component within serial communication assembly 400. Rate matching FIFO 402 functions to allow disc drive 100 to send (or read out) serial communication data 403 at a different rate than it is received (or written) as transmitted serial communication data 401 by the serial communication bus. Transmitted serial communication data 401 is moved into rate matching FIFO 402 at the rate set by the transmitter reference clock. Received serial communication data 403 is moved out of rate matching FIFO 402, at the rate set by receiver reference clock 404.

The individual serial communication protocols require that the transmitter reference clock and receiver reference clock 404 must match within some level of accuracy. For example, in the ANSI Fibre Channel protocol, the clocks must match to within 100 parts per million. The rate matching FIFO matches clock rates by the entry and removal of fill characters. Rate matching FIFO 402 outputs received serial communication data 403 in the same order that transmitted serial communication data 401 is received by rate matching FIFO 402.

In one embodiment, serial protocol monitor 406 monitors the contents of rate matching FIFO 402 to determine whether it meets a threshold. For instance, if rate matching FIFO 402 becomes too full, that means that data 401 is being received at FIFO 402 slightly faster than it is being transmitted out of FIFO 402 (as data 403) and serial protocol monitor 406 detects this and removes fill characters from rate matching FIFO 402. If rate matching FIFO 402 becomes too empty, that means that data 403 is being transmitted out of FIFO 402 faster than it is being received (as data 401), and serial protocol monitor 406 inserts fill characters in rate matching FIFO 402. In addition, serial protocol monitor 406 determines how many fill characters have been removed or inserted. The number of fill characters is determined by the particular protocol. If the number of fill characters removed or inserted per unit of time exceeds the serial communications protocol requirements, this is detected by monitor 406 and means that serial protocol monitor 406 may have detected a reference clock failure and acts on the failure.

Serial protocol monitor 406 (and, for that matter, clock failure detection circuit 201) may react to the possible detection of a reference clock failure in any desired way. This may be by providing one or more trigger outputs. An alarm output 408, for example, can activate a warning light 410 or an audible alarm 412. A serial communications interface disconnect output 414, can remove this particular disc drive from the serial communications network. Such a removal might include actuating a serial communications bypass 416 to re-route the serial communications around disc drive 100 to maintain a complete loop network architecture. A serial protocol fill character violation record output 418 can increment a serial protocol fill character violation record 420 to maintain a running tally of how many times fill character insertion or deletion had failed to meet the serial communication protocol. A serial protocol fill character violation indicator output signal 422 can indicate an excess or a shortage of fill characters in violation of the serial communication protocol, such as by activating any other desired output 424. These examples are not meant to limit the variety of potential outputs from serial protocol monitor 406 or the variety of devices which might be connected to serial protocol monitor 406.

The application uses protocol fill character insertion and deletion events as an indicator of the proper tolerance between the data transmission clock frequency and data receive clock frequency. If insertion or deletion events are occurring outside the bounds of what is allowed in the serial interface protocol this is an indication that there may be a reference clock failure.

A specific example of this occurs on the ANSI Fibre Channel Loop interface where a specific number of fill characters are provided in the transmission protocol to accommodate transmit and receive clock variations. If the transmit or receive clock is outside of the specification limits then the number of fill characters will be insufficient to avoid corruption of the data stream resulting in loss of data. This phenomena will be detected by monitoring either the insertion of too many fill characters or the deletion of more fill characters than are provided in the protocol. The occurrence of either of these events potentially indicates a problem with the reference clock frequency of the transmitter or the receiver. The application works equally well with other serial interface protocols, such as Serial ATA and Serial Attached SCSI, also having fill character requirements. The determination of what action to take as the result of this failure detection can be interface protocol specific or determined as desired by the user.

Figure 5:
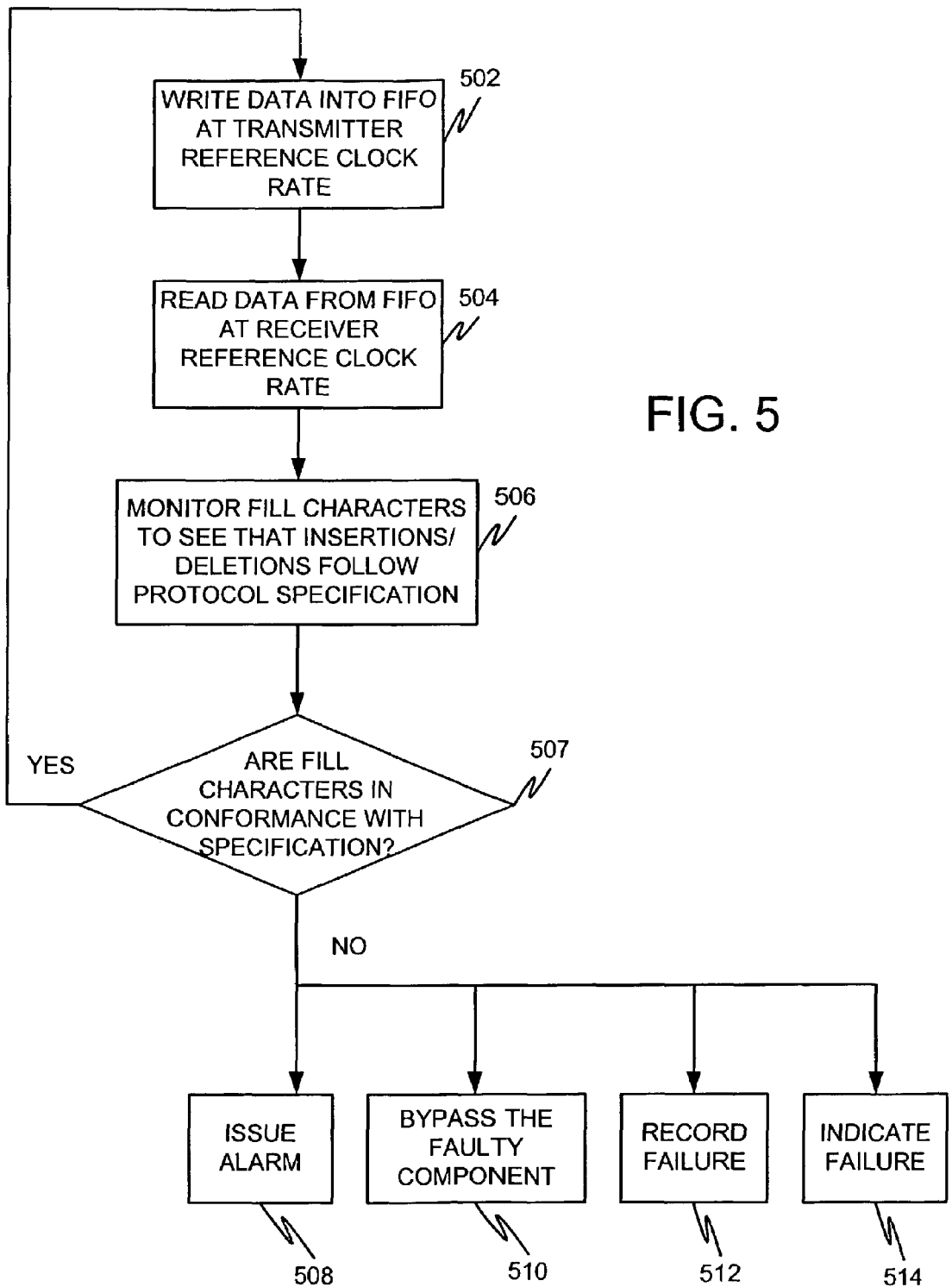
FIG. 5 is a flow chart illustrating an embodiment of the present invention.

FIG. 5 is a flow chart showing operation of an embodiment of the present invention. Flow chart 500 illustrates one embodiment of the steps of detecting the failure of a reference clock at a serial communications interface of a disc drive. In one step, data is written at the transmitter reference clock rate in conformance with a serial communications protocol, from the serial communications interface into the rate matching buffer 402. This is shown at block 502. The data is removed from the rate matching buffer 402 at the receiver reference clock rate and moved into the disc drive or to another destination. This is shown at block 504. Monitor 406 inserts and deletes fill characters in buffer 402 to accommodate minor variations in the transmitter and receiver reference clock frequencies. The insertions and deletions of fill characters to the data written into the rate matching buffer 402 is monitored by monitor 406 to verify that the insertions and deletions of fill characters meet the specified limits for the serial communication protocol. This is shown in block 506.

Additional steps may be required if the insertions and deletions of fill characters do not meet the specified limits, as indicated by block 507. An alarm may be issued to indicate that the test of block 507 has failed. This is shown in block 508. The serial communications interface may be switched to bypass the faulty component if the test of block 507 fails. This is shown in block 510. A record may be made of the failure. This is shown in block 512. Any other indication may be made or action taken to indicate the failure. This is shown in block 514.

In additional embodiments of the invention, for example, the method of blocks 502 through 514 may be practiced by a host computer, or any other device on the network, having a serial communications interface.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the serial interface while maintaining substantially the same functionality without departing from the scope and spirit of the present invention. In addition, although the one embodiment described herein is directed to a serial communication interface for a disc drive, it will be appreciated by those skilled in the art that the teachings of the present invention can be applied to any other device, such as a host computer, telecommunication systems, etc. using a serial communication interface, without departing from the scope and spirit of the present invention.

What is claimed is:

1. A data storage device, comprising:
    a reference clock, a rate matching first-in first-out buffer, a serial output and a serial input; the serial input receiving serial data and relaying the serial data through the rate matching first-in first-out buffer to the serial output as part of a loop network configuration, the serial output being clocked by the reference clock;
    a circuit that adds or subtracts fills characters in the rate matching first-in first-out buffer to match minor clock difference between the serial input and the reference clock;
    a reference clock monitor that detects a deviation of the minor clock difference that exceeds a threshold and provides a deviation signal; and
    a serial communication bypass that re-routes the serial data to maintain an intact loop network configuration when the reference clock monitor detects the deviation of the minor clock difference that exceeds the threshold.

2. The data storage device of claim 1 comprising data storage media in communication with the serial input and output.

3. The data storage device of claim 2 wherein the reference clock monitor monitors a number of fill characters added or deleted in the rate matching first-in first out buffer to detect the deviation.

4. The data storage device of claim 3 wherein the reference clock monitor further detects a total failure of the reference clock; and the serial communication bypass reroutes the serial data to maintain an intact loop network configuration when the reference clock monitor detects a total failure of the reference clock.

5. The data storage device of claim 2 wherein the serial output comprises an ANSI Fibre Channel serial communication protocol.

6. The data storage device of claim 2 wherein the reference clock monitor comprises:
    an enable flip flop that comprises a setting input and a resetting input, the enable flip flop providing an enable output; and
    a gate that receives the deviation signal and the enable output, the gate providing an enabled clock fault output that is enabled by the setting input and disabled by the resetting input.

7. The data storage device of claim 2 wherein the reference clock monitor provides an alarm output if the deviation exceeds the threshold.

8. The data storage device of claim 2 wherein the reference clock monitor provides a fill character violation indicator if the deviation exceeds the threshold.

9. The data storage device of claim 2 wherein the reference clock monitor provides a fill character violation record if the deviation exceeds the threshold.

10. A network, comprising:
    a plurality of devices comprising at least one host device and multiple data storage devices, each of the plurality of devices comprising a device reference clock, a device serial output, a device serial input and data storage media;
    a plurality of network connections, each network connection connecting a serial output from one of the devices to a serial input of another one of the devices to form a loop network configuration in which each of the plurality of devices receives serial data at its device serial input and relays serial data through a rate matching first-in first-out buffer to its device serial output, each device serial output being clocked by the device reference clock;

a circuit in each of the devices that adds or subtracts fills characters in the rate matching first-in first-out buffer to match minor clock difference between the device serial input and the device reference clock;

a reference clock monitor in each of the devices that detects a deviation of the minor clock difference that exceeds a threshold and provides a deviation signal; and a serial communication bypass in each of the devices that re-routes serial communication to maintain an intact loop network configuration when the reference clock monitor detects a deviation of the minor clock difference that exceeds a threshold.

11. The network of claim 10 wherein each device monitors a number of fill characters added or deleted in the rate matching first-in first out buffer to detect the deviation.

12. The network of claim 10 wherein at least one of the data storage devices comprises a disc drive.

13. The network of claim 10 wherein each device detects a total failure of the reference clock and the serial communication bypass reroutes the serial data to maintain an intact loop network configuration when the reference clock monitor detects a total failure of the reference clock.

14. The network of claim 10 wherein the serial output comprises an ANSI Fibre Channel serial communication protocol.

15. The network of claim 10 wherein the reference clock monitor comprises:

an enable flip flop that comprises a setting input and a resetting input, the enable flip flop providing an enable output; and a gate that receives the deviation signal and the enable output, the gate providing an enabled clock fault output that is enabled by the setting input and disabled by the resetting input.

16. A communication method for a data storage device, comprising:

relaying serial data through a serial input, a rate matching first-in, first-out buffer and a serial output in the data storage device as part of a loop network configuration;

providing data storage media in the data storage device that is coupled to the serial input and output;

clocking the serial output with a reference clock in the data storage device;

adding or subtracting fill characters in the rate matching first-in first-out buffer to match minor clock difference between the serial input and the reference clock;

monitoring deviation of the minor clock difference that exceeds a threshold and providing a deviation signal; and re-routing the serial data to maintain an intact loop network configuration when the monitoring detects a deviation of the minor clock difference that exceeds the threshold.

17. The method of claim 16, comprising:

monitoring a number of fill characters added or deleted in the rate matching first-in first out buffer to detect the deviation.

18. The method of claim 17, comprising:

detecting a total failure of the reference clock; and rerouting the serial data to maintain an intact loop network configuration when the reference clock monitor detects a total failure of the reference clock.

* * * * *